No. 630,700. Patented Aug. 8, 1899.
N. M. HOPKINS.
APPARATUS FOR PREVENTING BURSTING OF WATER PIPES BY FREEZING.
(Application filed May 2, 1899.)
(No Model.)
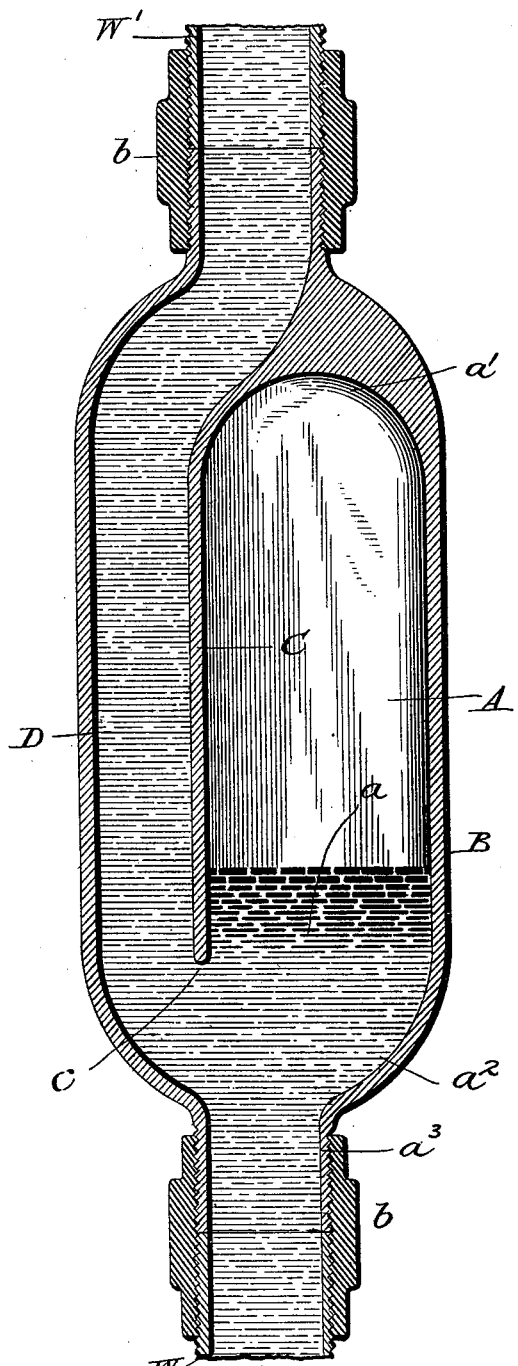
Witnesses
L. C. Hills
E. A. Bullock
Inventor:
Nevil M. Hopkins,
By Paulson Davidson Wight
Attorneys

UNITED STATES PATENT OFFICE.

NEVIL MONROE HOPKINS, OF WASHINGTON, DISTRICT OF COLUMBIA.

APPARATUS FOR PREVENTING BURSTING OF WATER-PIPES BY FREEZING.

SPECIFICATION forming part of Letters Patent No. 630,700, dated August 8, 1899.

Application filed May 2, 1899. Serial No. 715,364. (No model.)

*To all whom it may concern:*

Be it known that I, NEVIL MONROE HOPKINS, a citizen of the United States, residing in the city of Washington, District of Columbia, have invented certain new and useful Improvements in Apparatus for Preventing the Bursting of Water-Pipes by Freezing, of which the following is a specification.

In my Patent No. 616,188, of December 20, 1898, I have shown a series of expansion-chambers applied to a water-pipe and so arranged that the freezing water or ice expands into the chambers without causing the pipe itself to expand or burst. The specific form of expansion-chamber claimed in my patent above mentioned is one in which a flange or rib is employed to deflect the freezing water or ice laterally into the chamber. This particular construction is preferably always used for horizontally-arranged pipes; but for vertical pipes I prefer to employ a modified form of expansion-chamber; and my present invention relates to expansion-chambers for vertical pipes, the chamber having its mouth arranged in line or substantially in line with the direction of flow or pressure in the water-pipe.

The accompanying drawing shows a vertical central section through an expansion-chamber constructed in accordance with my invention. It shows also the manner of coupling or connecting the casting containing the chamber to a water-pipe.

The vertical water-pipe may be provided with any suitable number of expansion-chambers, arranged at suitable distances apart. The most convenient way of applying the expansion-chambers to the vertical pipe is that illustrated in the drawing, in which the expansion-chamber A is shown as formed in a casting B, provided with couplings $b$ for connecting its opposite ends to the water-pipe W'.

The essential feature of construction is the arrangement of the chamber A in such manner that it shall be in line with the direction of flow or pressure in the water-pipe indicated by the arrow, so that when ice forms the pressure will be direct into the chamber and will not be impeded by shoulders or the like.

The chamber A is air-tight and is closed except at its mouth $a$, which is arranged directly over the water-pipe W and in line with the direction of flow or pressure. Preferably the chamber is oblong, its major axis being vertical. The chamber may be curved or concave at its upper end $a'$, and at its lower end the outer wall of the chamber is curved at $a^2$ to gradually merge into the neck $a^3$, which is coupled to the water-pipe. The particular form of the chamber is not, however, absolutely essential. The inner wall C of the chamber terminates at $c$, and outside of this wall is a passage D for the flow of water from the water-pipe W below the casting to the water-pipe W' above it. It will be observed that this chamber or passage D is deflected laterally around the chamber A. It is of sufficient area in cross-section to permit the flow of water freely in the usual way. By making the casting containing the chambers A and D oblong and arranging them vertically I obtain a compact construction enabling water-pipes to be placed close together and also obtain a good form of expansion-chamber into which the ice may pass as quickly as it is formed. It will be understood that the air in the chamber A keeps the water at about the level indicated; but when ice forms the air is compressed to make room in the chamber for the expanding ice. In order to insure that the chamber shall be constantly filled with air, I may employ apparatus for supplying the chamber with air in the manner described in my application for patent, Serial No. 709,332, filed March 16, 1899.

I claim as my invention—

1. A water-pipe, a section of which is provided with a chamber open at both ends for the passage of water, and another chamber for containing air and for receiving ice or freezing water and having a mouth or opening in line, or substantially in line, with the direction of flow or pressure in the water-pipe.

2. A water-pipe in which is interposed a casting provided on one side with a free passage for water, and also on the other side with a vertically-arranged stationary or fixed air-containing chamber having a greater vertical length than breadth, and provided with a mouth at its lower end in line with the direction of flow or pressure in the water-pipe.

3. The combination of a water-pipe and an interposed, oblong casting provided with an air-tight, vertical expansion-chamber in line, or substantially in line, with the direction of flow or pressure in the water-pipe, and having a deflected passage around the chamber for the flow of water.

In testimony whereof I have hereunto subscribed my name.

NEVIL MONROE HOPKINS.

Witnesses:
HENRY E. COOPER,
E. A. BALLOCH.